(12) United States Patent
Chenchu et al.

(10) Patent No.: US 11,989,853 B2
(45) Date of Patent: May 21, 2024

(54) HIGHER-RESOLUTION TERRAIN ELEVATION DATA FROM LOW-RESOLUTION TERRAIN ELEVATION DATA

(71) Applicant: QUALCOMM Incorporated, San Diego, CA (US)

(72) Inventors: Rajesh Chenchu, Hyderabad (IN); Pradeep Kumar Jilagam, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/469,512

(22) Filed: Sep. 8, 2021

(65) Prior Publication Data

US 2023/0075840 A1    Mar. 9, 2023

(51) Int. Cl.
| | | |
|---|---|---|
| *G06T 17/00* | (2006.01) | |
| *G01C 5/00* | (2006.01) | |
| *G06N 20/00* | (2019.01) | |
| *G06T 1/20* | (2006.01) | |
| *G06T 3/4053* | (2024.01) | |

(52) U.S. Cl.
CPC .............. *G06T 3/4053* (2013.01); *G01C 5/00* (2013.01); *G06N 20/00* (2019.01); *G06T 1/20* (2013.01)

(58) Field of Classification Search
CPC .... G06T 3/40; G06T 3/00; G06T 1/00; G01C 5/00; G06N 20/00
USPC ....................................................... 345/428
See application file for complete search history.

(56) References Cited

U.S. PATENT DOCUMENTS

| | | | | |
|---|---|---|---|---|
| 2019/0156566 A1* | 5/2019 | Chen | ........................ | G06T 19/20 |
| 2021/0178274 A1* | 6/2021 | St-Pierre | ................ | G06N 3/047 |
| 2022/0126864 A1* | 4/2022 | Moustafa | .................. | G06T 9/00 |

OTHER PUBLICATIONS

Demiray B Z., et al., "D-SRGAN: DEM Super-Resolution with Generative Adversarial Network", arxiv.org, Cornell University Library, 201 Olin Library Cornell University Ithaca, NY 14853, Apr. 9, 2020, XP081641644, Abstract, p. 3, Paragraph III—p. 4, 8 Pages.
International Search Report and Written Opinion—PCT/US2022/039672—ISA/EPO—dated Dec. 8, 2022.

(Continued)

*Primary Examiner* — Gordon G Liu
(74) *Attorney, Agent, or Firm* — QUALCOMM Incorporated

(57) ABSTRACT

A terrain elevation data generation method includes: obtaining, at an apparatus, a low-resolution data set corresponding to a geographic area and comprising a plurality of low-resolution terrain elevation values corresponding to first locations within the geographic area; and applying, at the apparatus, the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

36 Claims, 12 Drawing Sheets

(56) References Cited

OTHER PUBLICATIONS

Mitra S., et al., "A Generative Approach to Visualizing Satellite Data", 2021 IEEE International Conference on Cluster Computing (Cluster), IEEE, Sep. 7, 2021, pp. 815-816, XP033985621, Abstract, p. 815, Paragraph III—p. 816, Paragraph V, 2 Pages.

Wu Z., et al., "Real-World DEM Super-Resolution Based on Generative Adversarial Networks for Improving InSAR Topographic Phase Simulation", IEEE Journal of Selected Topics in Applied Earth Observations and Remote Sensing, IEEE, USA, vol. 14, Aug. 18, 2021, pp. 8373-8385, XP011876712, Abstract, p. 8374, Left-hand column, Line 15—p. 8375, Paragraph II.A p. 8375, Paragraph III—p. 8377, Paragraph III.C , Figures 3,4, 13 Pages.

\* cited by examiner

HIGHER-RESOLUTION TERRAIN ELEVATION DATA FROM LOW-RESOLUTION TERRAIN ELEVATION DATA

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Mobile devices, that may be connected to wireless communication systems, may provide various data internally or externally, e.g., to users of the mobile devices. Mobile devices are often limited in the amount of information that may be stored by the mobile devices. Data storage limitations may affect the amount and/or type of information that may be stored and used by a mobile and/or provided to a user of the mobile device.

SUMMARY

In an embodiment, an apparatus includes: an interface; a memory; and a processor, communicatively coupled to the memory and the interface, configured to: obtain a low-resolution data set, the low-resolution data set corresponding to a geographic area and comprising a plurality of low-resolution terrain elevation values corresponding to first locations within the geographic area; and apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

In an embodiment, a terrain elevation data generation method includes: obtaining, at an apparatus, a low-resolution data set corresponding to a geographic area and comprising a plurality of low-resolution terrain elevation values corresponding to first locations within the geographic area; and applying, at the apparatus, the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

In an embodiment, an apparatus includes: means for obtaining a low-resolution data set corresponding to a geographic area and comprising a plurality of low-resolution terrain elevation values corresponding to first locations within the geographic area; and means for applying the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

In an embodiment, a non-transitory, processor-readable storage medium includes processor-readable instructions to cause a processor of an apparatus to: obtain a low-resolution data set corresponding to a geographic area and comprising a plurality of low-resolution terrain elevation values corresponding to first locations within the geographic area; and apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

DETAILED DESCRIPTION

Figure 1:
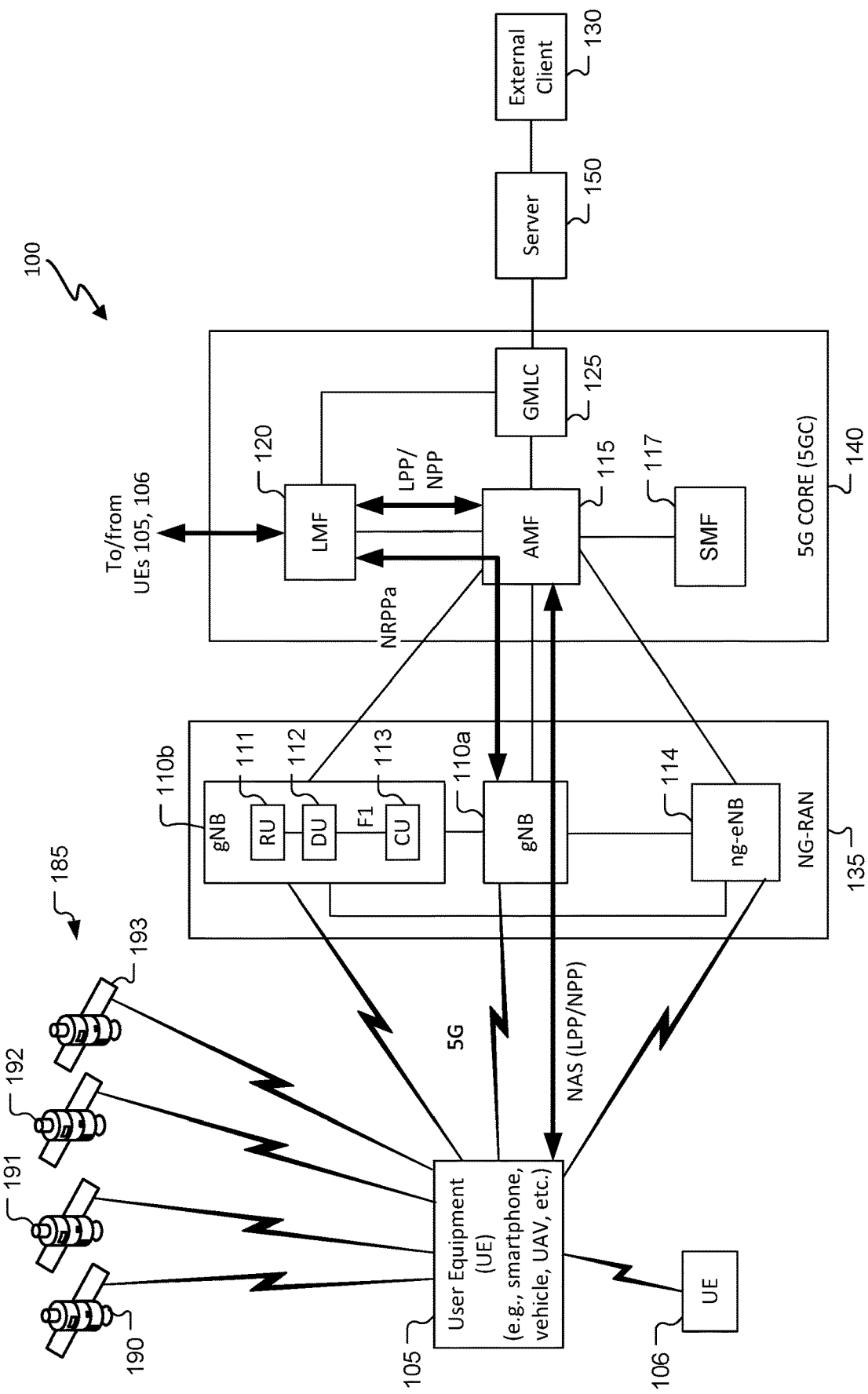
FIG. 1 is a simplified diagram of an example wireless communications system.

Techniques are discussed herein for producing and using high-resolution data from low-resolution stored data. For example, an apparatus may store low-resolution data such as low-resolution terrain elevation data. The apparatus may retrieve some or all of the low-resolution data and use a resolution enhancing model (e.g., a mathematical model produced using machine learning, such as deep machine-learning such as a generative adversarial network) to produce higher-resolution data. The higher-resolution data may be provided, e.g., to a user through a user interface such as a display. For example, higher-resolution terrain elevation data may be displayed to a user, e.g., to provide a more detailed terrain map than possible using the low-resolution data alone. As another example, a portion of a terrain map may be expanded (zoomed in on) and the expanded portion of the terrain map displayed with better resolution than providable by the low-resolution data alone, e.g., with the same resolution as, or better resolution than, the low-resolution data before expansion. Other configurations may be used.

Items and/or techniques described herein may provide one or more of the following capabilities, as well as other capabilities not mentioned. Higher-resolution data may be provided at an apparatus without storing the higher-resolution data on the apparatus. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, a flying vehicle or other flying device, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multicarrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
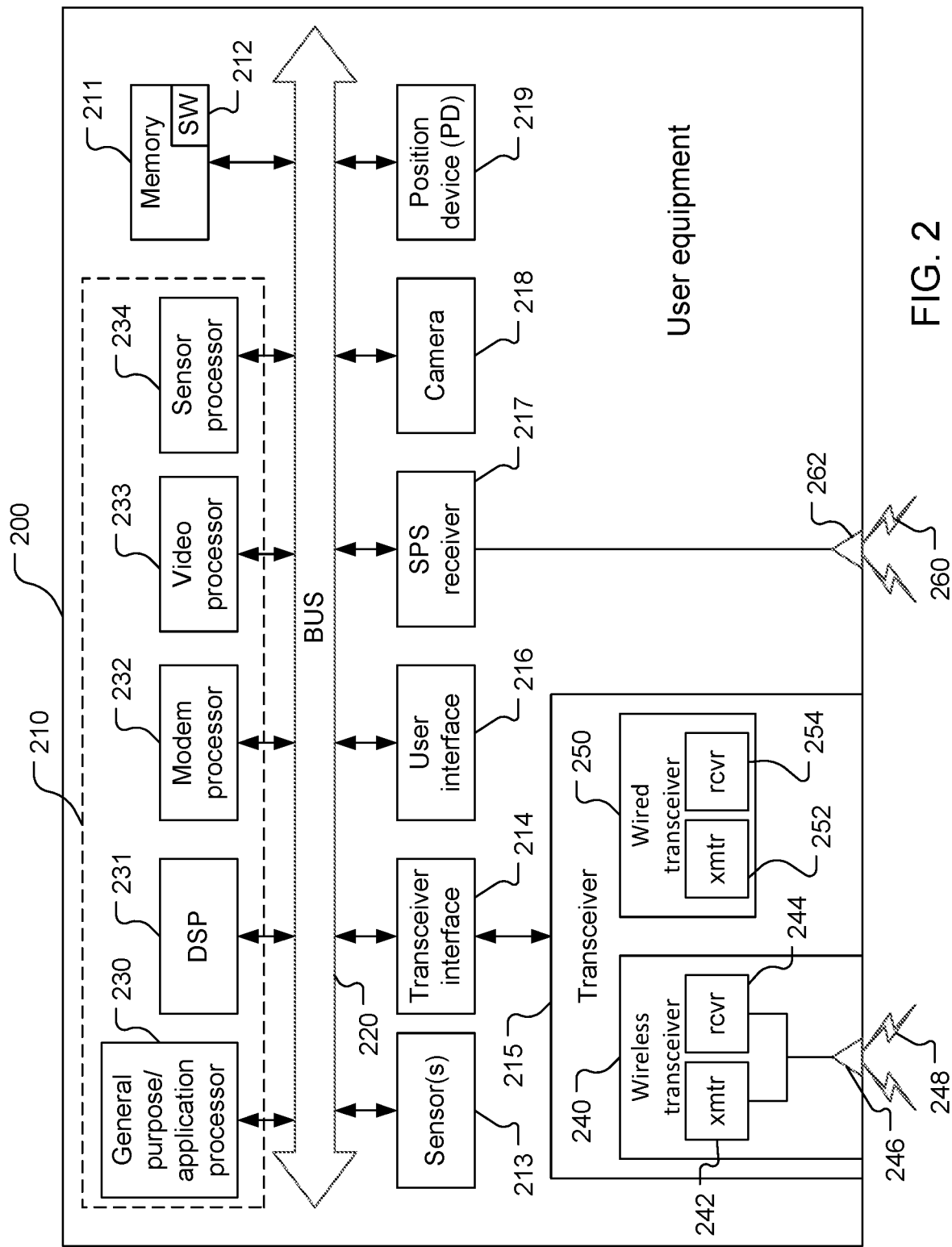
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
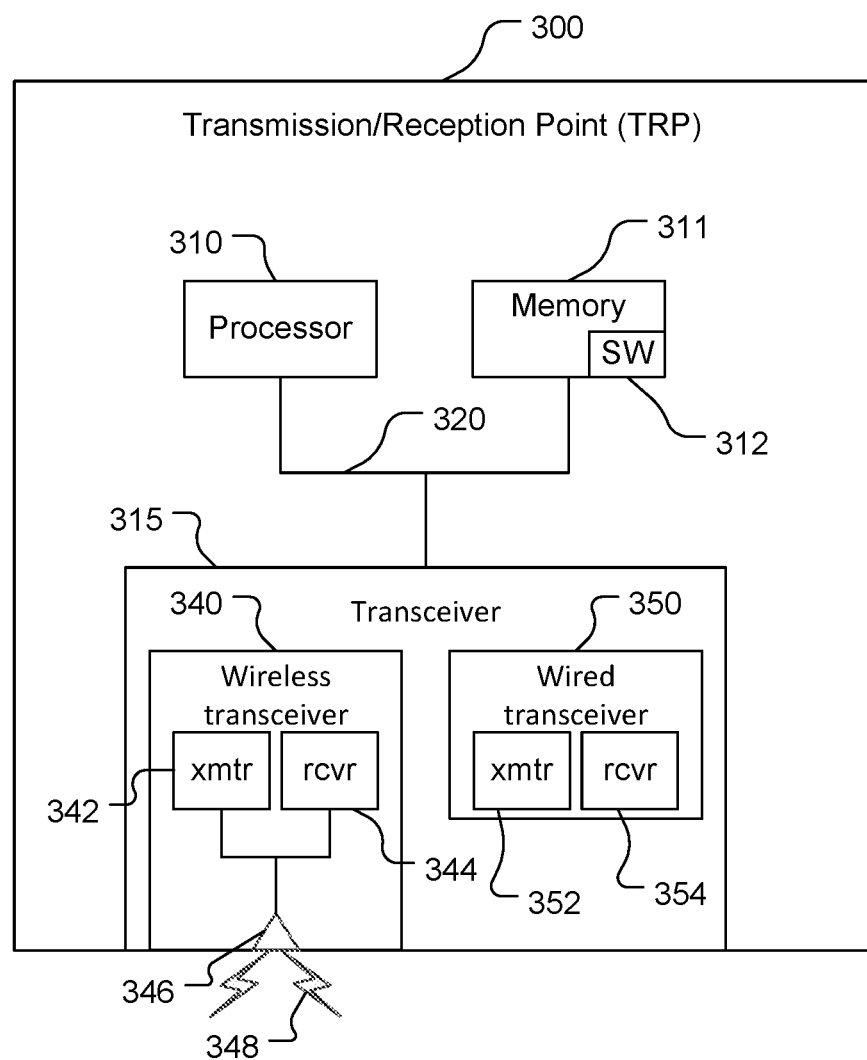
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
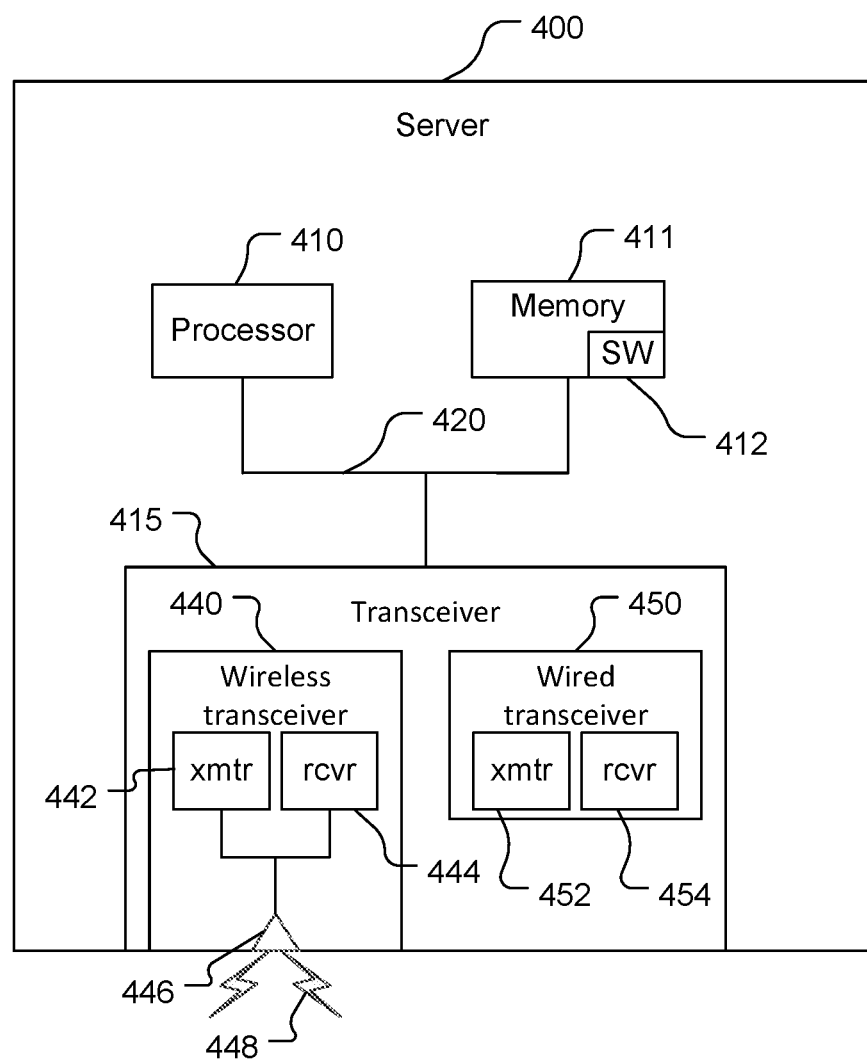
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Producing and Using Higher-Resolution Data from Low-Resolution Data

Providing high-resolution data by an apparatus such as mobile device, e.g., for use by the mobile device and/or for display to a user of the apparatus, may be challenging due to a data storage limitation for the apparatus. For example, high-resolution terrain data storage and visualization on embedded navigation display devices may be challenging due to the hardware limitations on devices. Terrain data are discussed herein as an example of high-resolution data and low-resolution data, but the discussion herein may be applied to other types of data. Terrain data may include elevations of corresponding locations, e.g., elevations of land, buildings, etc.

Terrain data sets may be available in different spatial resolutions, for example, 10-meter, 30-meter, 90-meter, 180-meter, etc. A 10-meter resolution data set will have a terrain elevation value for locations disposed about 10 meters apart, e.g., a grid of rows and columns with adjacent values in a row corresponding to locations about 10 m apart and adjacent values in a column corresponding to locations about 10 m apart. The terrain data may be stored in a database for moving map engines such that a map may be updated as a mobile device displaying the map moves. To reduce the database size, regions or spatial grids may be packed with a single-resolution data set instead of packing multiple resolutions for the same spatial grid. A size of a spatial grid for a terrain elevation map may span, for example, 1° of longitude and 1° of latitude. A higher-resolution terrain data set contains more elevation points for the same geographic area than a lower-resolution data set, and hence has more data than the lower-resolution data set. As of today, most moving map display systems, for example air and/or ground vehicle display systems and/or simulators, use lower-resolution data sets, for example either 90-meter or 180-meter data due to memory size and processing limitations. A map engine may receive position and altitude information, and obtain appropriate stored terrain information (e.g., based on a view angle and altitude information for 3D applications, or for 2D applications or sky view applications the same data are interpolated or simplified based on view angle). For example, for a 10 NM×10 NM (Nautical Miles) geographical view, terrain data may be simplified to fit into a display screen. The displayed data may be of low-resolution resulting in a low-quality image on the display. Discussion herein are techniques for producing approximate high-resolution data from low-resolution data, e.g., higher-resolution spatial terrain data from low-resolution spatial terrain data for better situational awareness in 2D and 3D map display systems.

Figure 5:
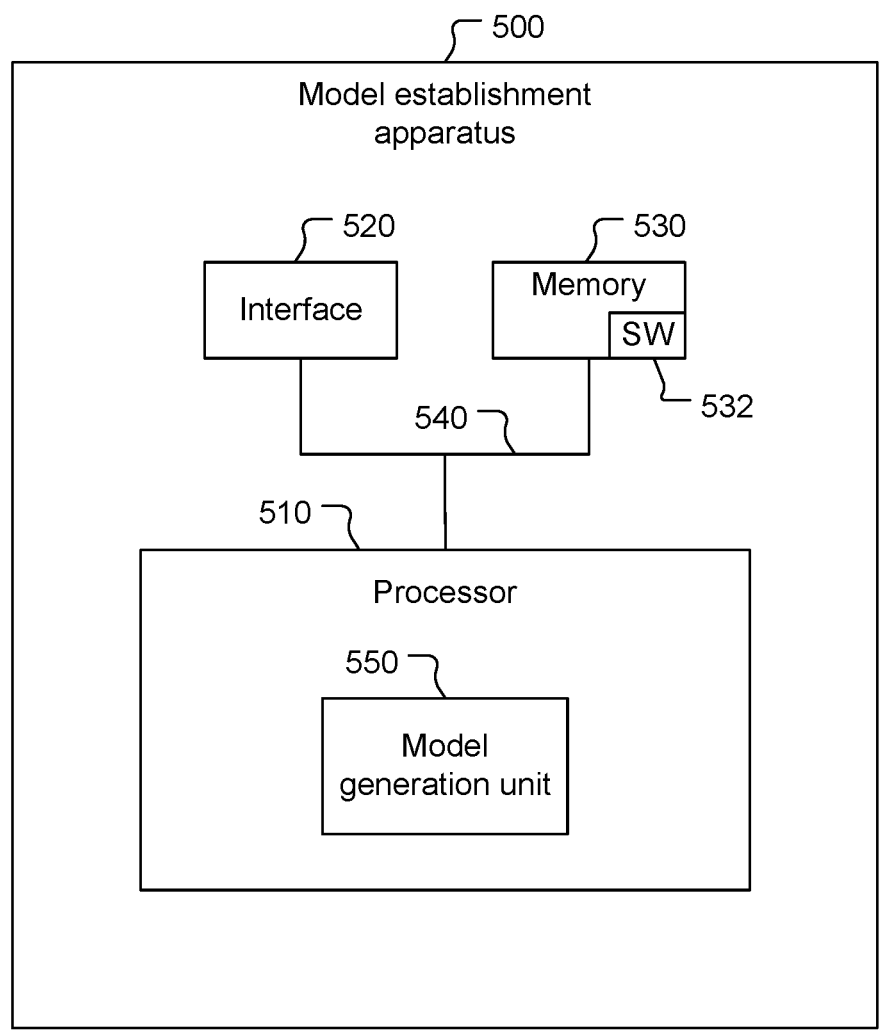
FIG. 5 is a block diagram of an example model establishment apparatus.

Referring to FIG. 5, with further reference to FIGS. 1-4, a model establishment apparatus 500 includes a processor 510, an interface 520, and a memory 530 communicatively coupled to each other by a bus 540. The model establishment apparatus 500 may include some or all of the components shown in FIG. 5. The processor 510 may include one or more intelligent hardware devices, e.g., a CPU, a microcontroller, an ASIC, an artificial intelligence processor (AI processor), etc. The processor 510 may comprise multiple processors (e.g., including a general-purpose/application processor, a DSP, etc.). The memory 530 is a non-transitory storage medium that may include RAM, flash memory, disc memory, and/or ROM, etc. The memory 530 may store software 532 which may be processor-readable, processor-executable software code containing instructions that are configured to, when executed, cause the processor 510 to perform various functions described herein. Alternatively, the software 532 may not be directly executable by the processor 510 but may be configured to cause the processor 510, e.g., when compiled and executed, to perform the functions. The interface 520 may include one or more components of a transceiver, e.g., a wireless transmitter and an antenna, or a wireless receiver and an antenna, or a wireless transmitter, a wireless receiver, and an antenna. Also or alternatively, the interface 520 may include a wired transmitter and/or a wired receiver. The interface 520 may include a network interface (wired or wireless) such as a network interface card (NIC).

The description herein may refer to the processor 510 performing a function, but this includes other implementations such as where the processor 510 executes software (stored in the memory 530) and/or firmware. The description herein may refer to the model establishment apparatus 500 performing a function as shorthand for one or more appropriate components (e.g., the processor 510 and the memory 530) of the model establishment apparatus 500 performing the function. The processor 510 (possibly in conjunction with the memory 530 and, as appropriate, the interface 520) includes a model generation unit 550. The model generation unit 550 is configured to use machine-learning (e.g., deep learning such as a generative adversarial network) to produce a model for converting low-resolution data into higher-resolution data (e.g., low-resolution terrain elevation data into higher-resolution terrain elevation data). Functionality of the model generation unit 550 is discussed further herein, and the processor 510 (and one or more other components as appropriate) is configured to perform the functions of the model generation unit 550 discussed herein.

Figure 6:
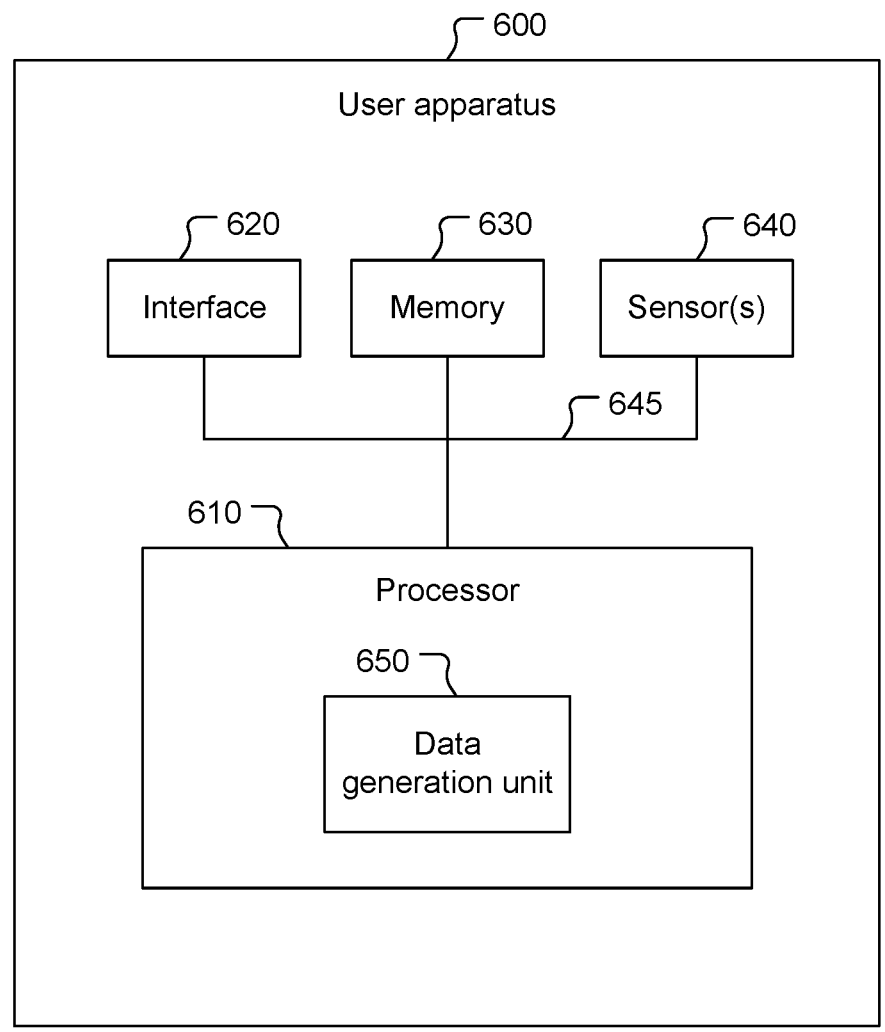
FIG. 6. is a block diagram of an example user apparatus.

Referring also to FIG. 6, a user apparatus 600 includes a processor 610, an interface 620, a memory 630, and one or more sensors 640, communicatively coupled to each other by a bus 645. The user apparatus 600 may include some or all of the components shown in FIG. 5. The processor 610 may include one or more intelligent hardware devices, e.g., a CPU, a microcontroller, an ASIC, an artificial intelligence processor (AI processor), etc. The processor 610 may comprise multiple processors (e.g., including a general-purpose/application processor, a DSP, etc.). The memory 630 is a non-transitory storage medium that may include RAM, flash memory, disc memory, and/or ROM, etc. The memory 630 may store software 532 which may be processor-readable, processor-executable software code containing instructions that are configured to, when executed, cause the processor 610 to perform various functions described herein. Alternatively, the software 532 may not be directly executable by the processor 610 but may be configured to cause the processor 610, e.g., when compiled and executed, to perform the functions. The interface 620 may include one or more components of a transceiver, e.g., a wireless transmitter and an antenna, or a wireless receiver and an antenna, or a wireless transmitter, a wireless receiver, and an antenna. Also or alternatively, the interface 620 may include a wired transmitter and/or a wired receiver. The interface 620 may include a network interface (wired or wireless) such as a network interface card (NIC). The interface may include a user interface, e.g., a display for providing images, text, etc. The sensor(s) 640 may comprise one or more sensors for determining a location of the user apparatus. For example, the sensor(s) may include an SPS receiver and an SPS antenna (e.g., similar to the SPS receiver 217 and the SPS antenna 262). The sensor(s) 640 may also or alternatively including one or more sensors for receiving cellular signals to determine a location of the user apparatus 600, e.g., as a cell sector center, as a function of a range to a TRP, etc.

The description herein may refer to the processor 610 performing a function, but this includes other implementations such as where the processor 610 executes software (stored in the memory 630) and/or firmware. The description herein may refer to the user apparatus 600 performing a function as shorthand for one or more appropriate components (e.g., the processor 610 and the memory 630) of the user apparatus 600 performing the function. The processor 610 (possibly in conjunction with the memory 630 and, as appropriate, the interface 620) includes a data generation unit 650. The data generation unit 650 is configured to apply a resolution enhancing model (e.g., a mathematical model developed by the model generation unit 550 of the model establishment apparatus 500) to low-resolution data to produce higher-resolution data (e.g., higher-resolution terrain elevation data from low-resolution terrain elevation data). Functionality of the data generation unit 650 is discussed further herein, and the processor 610 (and one or more other components as appropriate) is configured to perform the functions of the data generation unit 650 discussed herein.

Figure 7:
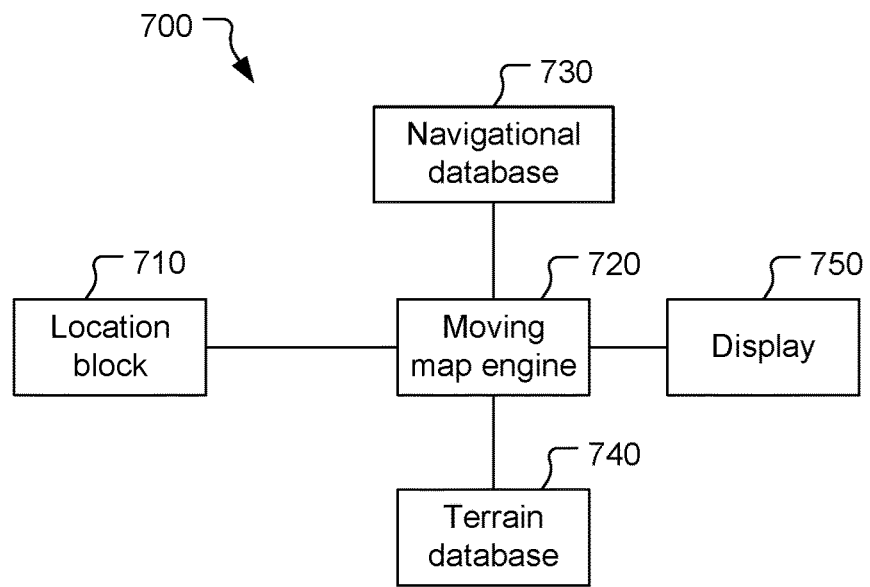
FIG. 7 is a block diagram of an architecture for providing a moving map.

Terrain data sets may be provided as moving maps where the map displayed is updated over time corresponding to change in relevant map data, e.g., due to motion and/or viewing angle of a user apparatus for which the terrain data are relevant. Moving map systems may use a DEM (Digital Elevation Model) for visualizing the terrain data in 2D or 3D formats for situational awareness. For example, referring to FIG. 7, an architecture 700 for providing a moving map includes a location block 710, a moving map engine 720, a navigational database 730, a terrain database 740, and a display 750. The architecture may be implemented by the user apparatus 600, with the moving map engine 720 and the location block 710 implemented by the processor 610 (and the memory 630 as appropriate), the navigational database 730 and the terrain database 740 stored in the memory 630, and the display 750 implemented by the interface 620). The location block 710 and the moving map engine 720 may comprise one or more processors (e.g., which may include memory and software that can be executed by one or more processors). The location block 710 is configured to determine a location of an apparatus, e.g., based on one or more inputs such as one or more sensor measurements (e.g., GNSS signal measurements) and provide the location to the moving map engine 720. The moving map engine 720 is configured to use the location provided by the location block 710 to retrieve terrain data from the terrain database 740 corresponding to an area that includes the location of the apparatus. The terrain data retrieved may also depend on one or more other factors such as one or more attributes of the apparatus (e.g., maximum altitude of the apparatus). The location block 710 can provide locations of the apparatus over time, and the moving map engine 720 can retrieve new terrain data as appropriate. The moving map engine 720 provides the terrain data to the display 750 and the display is configured to display the terrain data, e.g., in a 2D or 3D image on a screen. The navigational database 730 includes information about routes between locations and the moving map engine 720 may retrieve appropriate route information, and other navigational data (e.g., permitted direction of travel) as appropriate, from the navigational database 730 and provide the route information to the display 750. The display 750 can display the route information (e.g., a path) on the displayed terrain data (e.g., overwriting pixels of the terrain data with a visual representation of the path corresponding to the route information). The moving map engine 720 may also use one or more additional offline and/or online databases, for example including weather and/or traffic information, for situational awareness.

Figure 8:
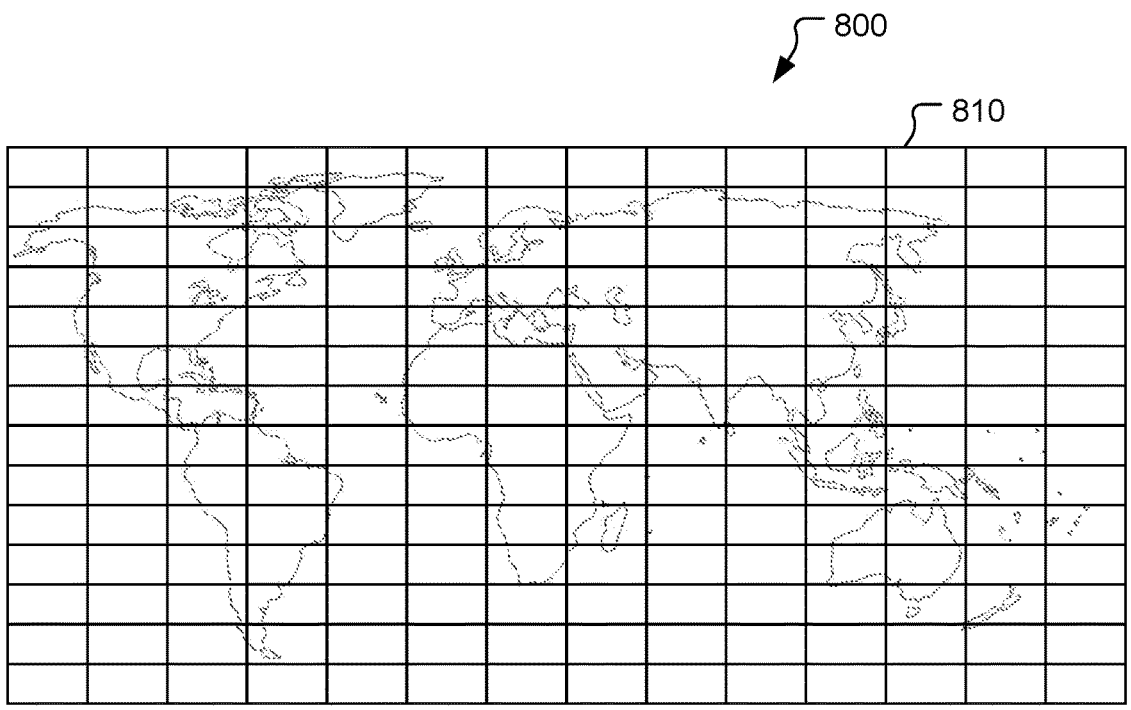
FIG. 8 is a block diagram of an example of a global map divided into a grid of terrain patches.

The terrain database 740 may contain one or more elevation data sets, e.g., for different geographical areas. The geographical areas may have a global or nearly global span. The geographical areas stored in, or retrieved from, the terrain database 740 may span various areas, e.g., depending upon a use of the terrain data, e.g., for a local airline service or a global airline service. For example, referring also to FIG. 8, a global map 800 may divided into a grid of terrain patches 810 (even though some of the terrain patches 810 may overly no terrain) and the terrain patches for a country or a continent, or other relevant region, may be retrieved by the moving map engine 720. The terrain database 740 may include low-resolution data sets, for example 90m or 180 m for one or more countries, with terrain data organized into terrain patches each spanning an area, for example, extending about 1° of longitude and 1° of latitude. The terrain database 740 may include a single database of a single resolution (e.g., 90 m), or may include multiple databases each of a respective resolution, and/or may include a database with different patches having different resolutions (e.g., one patch may include 90 m data and an adjacent patch may include 180 m data).

The moving map engine 720 and the display 750 are configured for image generation and display. The elevation values in terrain patches retrieved by the moving map engine 720 may be assigned color values (e.g., red-green-blue (RGB)) color values to produce color pixels of different colors corresponding to different elevations. The moving map engine 720 may be configured to apply a resolution enhancing model to low-resolution data to produce higher-resolution data that can be used by the display 750 to produce an image, e.g., with better resolution than the low-resolution data and that can be zoomed in on while providing useful resolution (e.g., without interpolating between elevation points or interpolating at a finer resolution than with the low-resolution data).

Figure 9:
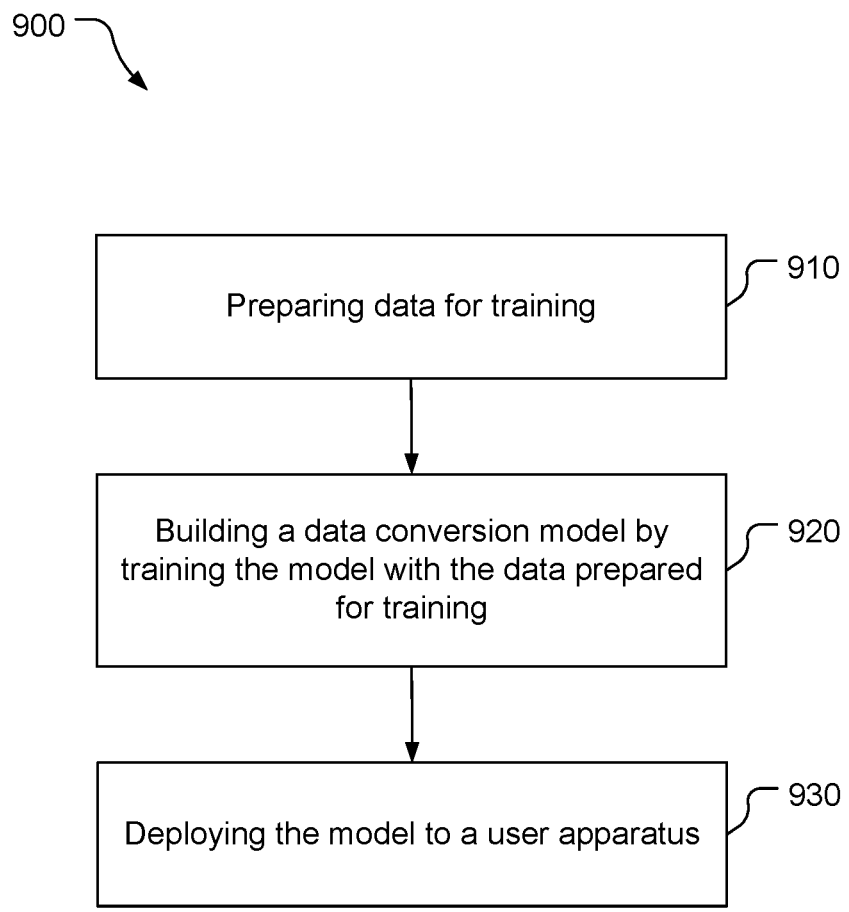
FIG. 9 is a block flow diagram of a method for producing and providing a resolution enhancing model.

Referring to FIG. 9, with further reference to FIGS. 1-8, a method 900 for producing and providing a resolution enhancing model to the user apparatus 600 includes the stages shown. The method 900 is, however, an example only and not limiting. The method 900 may be altered, e.g., by having stages added. At stage 910, the method 900 includes preparing data for training. At stage 920, the method 900 includes building a resolution enhancing model by training the model with the data prepared for training at stage 910. At stage 920, the method 900 includes deploying the model to the user apparatus 600, e.g., the moving map engine 720 implemented by the processor 610. The method 900 uses deep learning techniques to produce higher-resolution data, e.g., to produce higher-resolution terrain elevation data and to produce images from the higher-resolution terrain elevation data. For example, terrain elevation data may be converted into triangular pieces and used to generate 2D or 3D images using a graphics pipeline.

At stage 910, the model establishment apparatus 500 prepares data for training offline. For example, the model establishment apparatus 500 may be implemented by a manufacturer of the user apparatus 600 so a resolution enhancing model may be stored in the user apparatus during manufacture. Also or alternatively, the model establishment apparatus 500 may be implemented by a service provider that provides data conversion models to the user apparatus 600, e.g., on a subscription basis. The model establishment apparatus 500, e.g., the model generation unit 550, may collect data patches of low-resolution data and high-resolution data, e.g., terrain elevation patches from low-resolution terrain elevation data and from high-resolution terrain elevation data. The patches are segments of the data, e.g., corresponding to respective geographic regions (e.g., 1° of longitude and 1° of latitude). High-resolution patches have higher data density than the low-resolution patches, with more data points per patch in the high-resolution patches, e.g., more terrain elevation values per unit area. For example, the model generation unit 550 may retrieve from the memory 530, or receive through the interface 520, N×N low-resolution terrain elevation patches and M*N×M*N high-resolution terrain elevation patches. The value of N is typically greater than 64 and is typically a power of two, such as 256. The value of M is typically a power of two and less than 16, e.g., two or four or eight.

Figure 10:
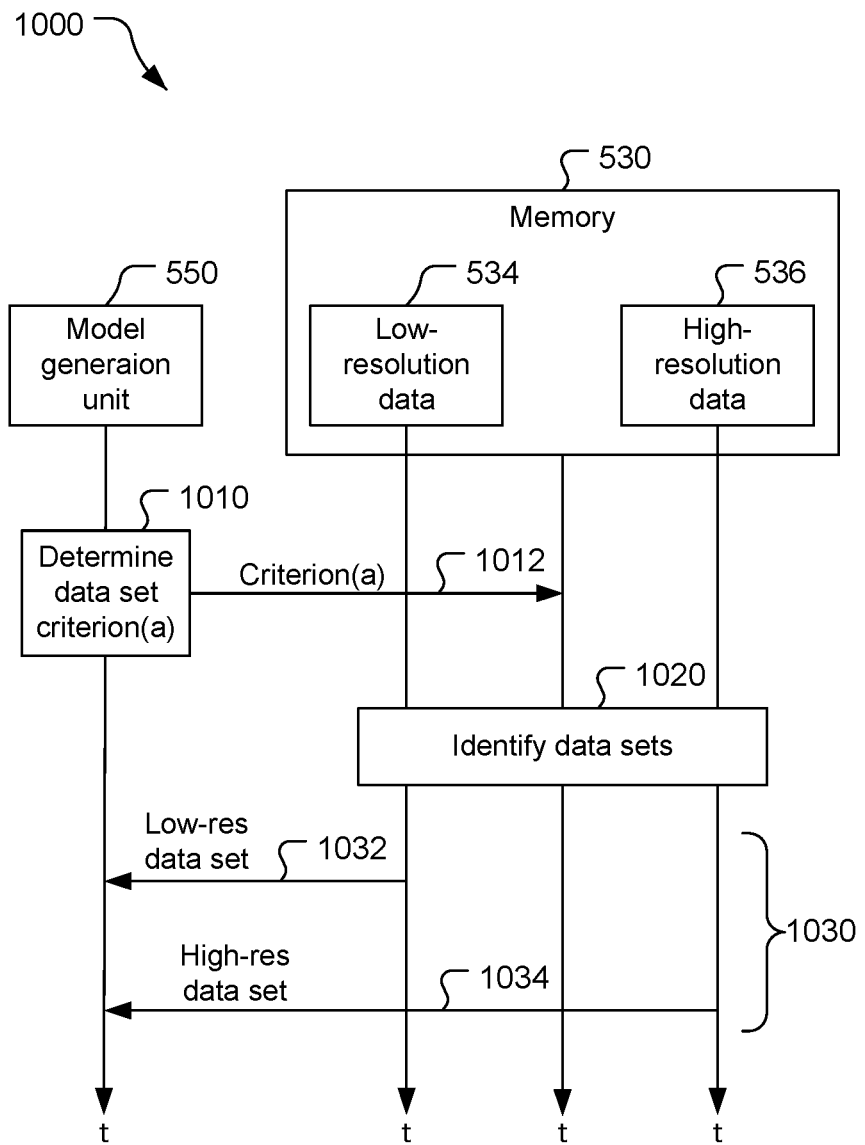
FIG. 10 is a processing and signal flow for obtaining low-resolution data and high-resolution data.

The model generation unit 550 obtains low-resolution data and high-resolution data to be used to produce one or more resolution enhancing models for converting the low-resolution data into higher-resolution data (e.g., approximating the high-resolution data). For example, the low-resolution data and the high-resolution data may be retrieved from memory and/or received via the interface 520 from another entity. Referring also to FIG. 10, a signaling and process flow 1000 includes the stages shown for obtaining low-resolution and high-resolution data for training a resolution enhancing model using deep learning. The flow 1000 is an example, as stages may be added, rearranged, and/or removed.

At stage 1010, the model generation unit 550 determines one or more criteria for identifying low-resolution data and high-resolution data to be retrieved. For example, the model generation unit 550 may identify one or more parameters such as an amount of data, or an amount of data points. As another example, for geographic-related data such as terrain elevation data, the model generation unit 550 may identify a geographic area for which data are to be retrieved. The model generation unit 550 may identify a bounding box corresponding to a geographic area. The bounding box defines a boundary for a domain of input values (e.g., a perimeter for a domain of geographic locations). The perimeter may be defined in various ways, e.g., a regular shape (e.g., a rectangle, a circle, etc.) or an irregular shape (e.g., a polygon defining a shape that is not a regular shape). The bounding box may be identified by generating a description of the boundary (e.g., coordinates), or by selecting from a set of predefined boundary boxes (e.g., randomly selecting from the set, methodically selecting from the set, e.g., in a sequence, etc.), or in another way. The model generation unit 550 transmits an indication 1012 of the one or more determined criteria (e.g., bounding box coordinates) for the low-resolution data and the high-resolution data to the memory 530.

At stage 1020, the memory 530 identifies a data set of low-resolution data 534 (e.g., a low-resolution data database) and a data set of high-resolution data 536 (e.g., a high-resolution data database) corresponding to the one or more data set criteria indicated by the indication 1012. For example, the one or more data set criteria may identify a geographic region and terrain elevation data of the low-resolution data 534 within the identified geographic region may comprise an N×N set of data points, and terrain elevation data of the low-resolution data 534 within the identified geographic region may comprise an M*N×M*N (e.g., 4N×4N) set of data points. Thus, for example, the data set of the low-resolution data 534 may be a 2×2 set of locations and corresponding elevations, and the data set of the high-resolution data 536 may be an 8×8 set of locations and corresponding elevations for the same geographic region.

At stage 1030, the memory 530 transmits the identified data sets to the model generation unit 550. The memory 530 transmits a low-resolution data set 1032 containing the identified data set of the low-resolution data 534 and transmits a high-resolution data set 1034 containing the identified data set of the high-resolution data 536. For example, the low-resolution data set may be 180 m terrain elevation data and the high-resolution data set may be 30 m terrain elevation data.

Figure 11:
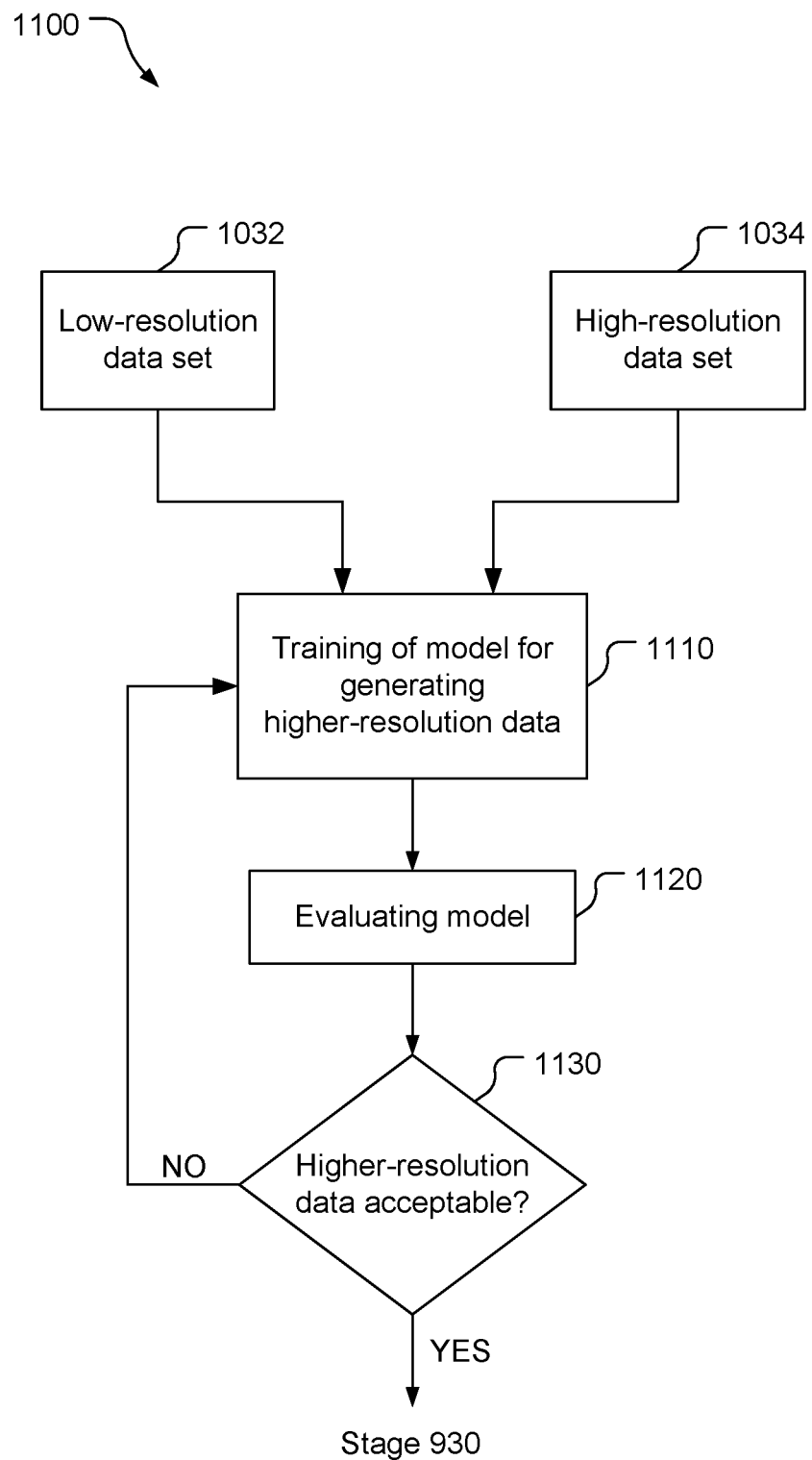
FIG. 11 is a block diagram of a method for building and training the resolution enhancing model.

Referring again in particular to FIG. 9, at stage 920, the model generation unit 550 builds a resolution enhancing model using the low-resolution data set 1032 and the high-resolution data set 1034 prepared at stage 910. For example, referring also to FIG. 11, a method 1100 for building and training the resolution enhancing model for generating higher-resolution data from low-resolution data includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes the model generation unit 550 building a resolution enhancing model for generating higher-resolution data from low-resolution data. For example, the model generation unit 550 obtains the low-resolution data set 1032 and the high-resolution data set 1034 and builds a resolution enhancing model to convert the low-resolution data set 1032 to a higher-resolution data set, attempting to have the higher-resolution data set match the high-resolution data set 1034. The resolution enhancing model may be a multivariate model with different weighting factors (e.g., coefficients) that uses one or more low-resolution data points (e.g., location(s) and corresponding elevation(s)) as input and provides as output one or more higher-resolution data points. On subsequent executions of stage 1110, the method 1100 includes the model generation unit 550 training the resolution enhancing model as discussed further below.

At stage 1120, the method 1100 includes evaluating the resolution enhancing model. For example, the model generation unit 550 provides the low-resolution data set 1032 as input to the resolution enhancing model and runs the resolution enhancing model to generate a higher-resolution data set from the low-resolution data set 1032. The data density of the higher-resolution data is higher than the data density of the low-resolution data. The higher-resolution data enables more detailed data analysis than with the low-resolution data. For example, for terrain elevation data displayed to a user, the higher-resolution data facilitates zooming, i.e., selection of a portion of the display to be expanded, with the expanded data having a data density that is higher than if a corresponding portion of the low-density data was expanded. The expanded data of the higher-resolution data will have a new data density (e.g., if one-half of the bounding box is zoomed in on, then the data density will be reduced by half), and the new data density may be, for example, as high or higher than the data density of the non-expanded low-resolution data. This helps avoid using techniques such as interpolation between data points to attempt to add resolution. Interpolation may yield values that are less accurate than those of the higher-resolution data, thus decreasing accuracy of the data, which may, for example, result in lack of situational awareness, e.g., for a pilot.

At stage 1130, the method 1100 includes determining whether the higher-resolution data set is acceptable. For example, the model generation unit 550 determines how well the higher-resolution data set matches the high-resolution data set 1034. If the higher-resolution data set is not acceptable, e.g., a metric of closeness of the higher-resolution data set to the high-resolution data set 1034 is above a threshold level (e.g., has not converged to below a threshold difference (e.g., average elevation difference for all locations in the data set)), then the method 1100 returns to stage 1110, where the method 1100 includes training the resolution enhancing model. To train the resolution enhancing model, the model generation unit 550 may employ one or more deep learning techniques based on the differential between the higher-resolution data set and the high-resolution data set 1034. For example, the model generation unit 550 may employ a generative adversarial network (GAN) to perform machine learning to modify the resolution enhancing model (e.g., modify functions and/or weighting values) to attempt to better approximate the high-resolution data set 1034 with the higher-resolution data set produced by the resolution enhancing model using the low-resolution data set 1032 as input. The method 1100 returns to stage 1120 to use the resolution enhancing model, as modified, to produce a new higher-resolution data set using the low-resolution data set 1032. Stages 1110, 1120, 1130 are repeated until the higher-resolution data set is acceptable. If the higher-resolution data set is acceptable, e.g., a metric of closeness of the higher-resolution data set to the high-resolution data set 1034 is below a threshold level (e.g., has converged to below a threshold difference (e.g., average elevation difference for all locations in the data set)), then the method 1100 ends such that the method 900 proceeds to stage 930.

Referring again to FIG. 9, at stage 930, the method 900 includes deploying the resolution enhancing model to a user apparatus. The model generation unit 550 may transmit the resolution enhancing model that produced acceptable higher-resolution data through the interface 520 to the user apparatus 600. For example, the resolution enhancing model may be stored in a device (e.g., a mobile phone, a flying vehicle or other flying device, etc.) during manufacture. As another example, the resolution enhancing model may be transmitted via the interface and a communication network (e.g., a wired communication network and/or a wireless communication network) to the user apparatus 600 to provide a software update, e.g., as new low-resolution data are obtained and/or as one or more new resolution enhancing models (e.g., for one or more corresponding data sets) are determined.

Stages 910 and 920 may be repeated for different low-resolution data sets as appropriate to produce different corresponding resolution enhancing models. For example, each low-resolution data set may correspond to a portion of the total low-resolution data (e.g., a 1°×1° map portion of a larger map, e.g., of a country, a continent, the world, or other geographic area). The model generation unit 550 may determine a different resolution enhancing model for each low-resolution data set. Stages 910 and 920 may be repeated until all desired data sets (e.g., all terrain elevation data sets for a desired geographic area) have been used to generate corresponding resolution enhancing models.

The user apparatus 600 may apply the resolution enhancing model to stored low-resolution data to produce higher-resolution data that can be provided to a user such that the user is able to take advantage of information provided by the higher-resolution without the user apparatus having to store the higher-resolution data or the high-resolution data. The user apparatus 600, e.g., the data generation unit 650 may produce the higher-resolution data in an ad hoc manner, producing higher-resolution data that are presently relevant without producing higher-resolution data from all stored low-resolution data.

Figure 12:
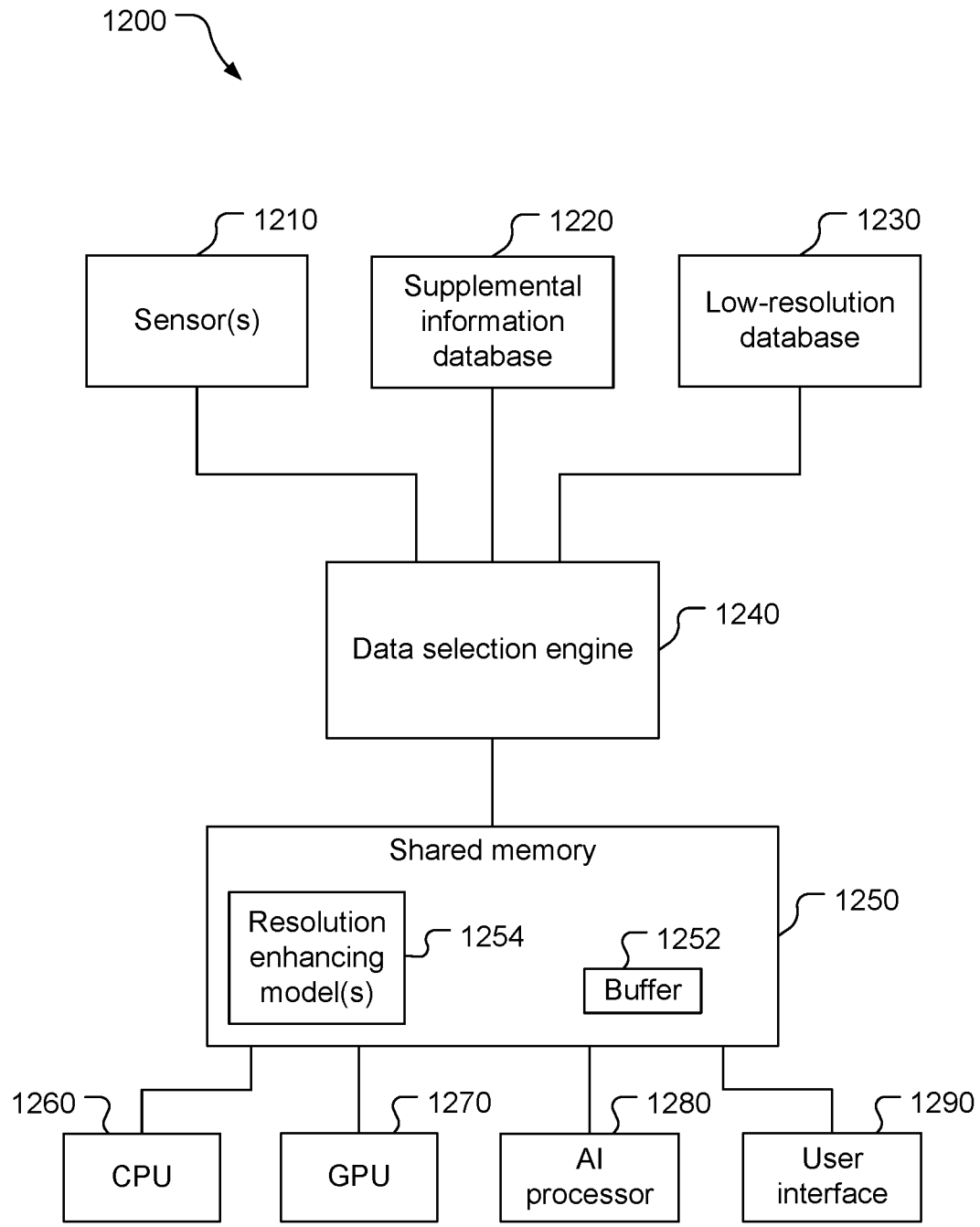
FIG. 12 is a block diagram of an example of components of the user apparatus shown in FIG. 6.

Referring also to FIG. 12, a user apparatus 1200, which is an example of the user apparatus 600, includes one or more sensors 1210, a supplemental information database 1220, a low-resolution-data database 1230, a data selection engine 1240, a shared memory 1250, a CPU 1260, a GPU 1270 (graphics processing unit), an AI processor 1280 (artificial intelligence processor), and a user interface 1290. The CPU 1260, the GPU 1270, and the AI processor 1280 are example components of the processor 610. The supplemental information database 1220 and the low-resolution-data database 1230 may be stored in memory that is an example of the memory 630. The shared memory 1250 may be an example component of the memory 630. The CPU 1260 may be configured to coordinate operation of the GPU 1270 and the AI processor 1280, e.g., with queuing operations to control the flow of information to the GPU 1270 and the AI processor 1280 and the order and timing of operations performed by the GPU 1270 and the AI processor 1280. The GPU 1270 and the AI processor 1280 are configured to perform operations faster than the CPU 1260 and the AI processor 1280 may be configured to perform operations faster than the GPU 1270.

The data selection engine 1240 is configured to determine and selectively provide low-resolution data from the low-resolution-data database 1230 to the shared memory 1250. The data selection engine 1240, which may be implemented by the CPU 1260 (and possibly software stored in memory), determines what low-resolution data to retrieve from the low-resolution-data database 1230. For example, the data selection engine 1240 may obtain one or more indications from the sensor(s) 1210 and use the indication(s) to determine a data set of the low-resolution data. The indication(s) may, for example, indicate a location of the user apparatus 1200 (e.g., if the sensor(s) 1210 include an SPS receiver) or may indicate one or more measurements (e.g., satellite signal measurement(s) and/or terrestrial-based-signal measurement(s)) from which a location estimate for the user apparatus 1200 may be determined. The data selection engine 1240 may use a location estimate for the user apparatus 1200 to request a corresponding data set, spanning the location estimate, from the low-resolution-data database 1230. The data selection engine 1240 may, for example, compute a bounding box based on the location estimate and fetch a low-resolution data set, from the low-resolution-data database 1230, that includes terrain elevation values for locations within the bounding box, e.g., a corresponding terrain patch. The data selection engine 1240 provides the low-resolution data set to the shared memory 1250 and the shared memory 1250 stores the low-resolution data set, e.g., in a buffer 1252 such as a frame buffer.

The CPU 1260 controls the GPU 1270 and/or the AI processor 1280 to execute a resolution enhancing model corresponding to the low-resolution data set retrieved from the low-resolution-data database 1230 and stored in the buffer 1252. The shared memory 1250 stores one or more resolution enhancing models 1254, with each resolution enhancing model corresponding to respective low-resolution data, with a low-resolution data set comprising some or all low-resolution data corresponding to a resolution enhancing model. The GPU 1270 and/or the AI processor 1280 applies the low-resolution data set to the appropriate resolution enhancing model and executes the resolution enhancing model to produce a higher-resolution data set and store the higher-resolution data set in the shared memory 1250.

Graphical data corresponding to the higher-resolution data may be conveyed to a user. The GPU 1270 may process the higher-resolution data set stored in the shared memory 1250 to produce corresponding graphical data (e.g., red, green, and blue intensity values to produce different colors corresponding to different elevation values) and store the graphical data in the shared memory 1250, e.g., in the buffer 1252. The user interface 1290 may retrieve the graphical data from the shared memory 1250 and use the graphical data to produce an image (e.g., a two-dimensional or three-dimensional image) on a display for a user. The user interface 1290 may display multiple images in succession, e.g., if the user apparatus 1200 is moving, to provide a moving map corresponding the movements of the user apparatus 1200.

Executing the resolution enhancing model using the GPU 1270 and/or the AI processor 1280 will produce the higher-resolution data set faster than using the CPU 1260, e.g., such that an image of terrain elevation based on the higher-resolution data set may be provided to a user faster than using the CPU 1260, and multiple images providing a moving map can be provided to the user faster than using the CPU 1260. The CPU 1260 can coordinate operation of the GPU 1270 and the AI processor 1280 to implement workload sharing between the GPU 1270 and the AI processor 1280 to execute the resolution enhancing model, or to execute multiple resolution enhancing models. The GPU 1270 and the AI processor 1280 may execute the resolution enhancing model(s) concurrently. The GPU 1270 may process the higher-resolution data to produce the graphical data while the AI processor 1280 concurrently executes the resolution enhancing model to produce further higher-resolution data. Executing the resolution enhancing model on the low-resolution data set allows higher-resolution data to be produced and used, e.g., by the user interface 1290 to provide more-useful information to a user (e.g., allowing zooming in on images) without storing the higher-resolution data long term, or storing higher-resolution data corresponding to all of the low-resolution data in the low-resolution-data database 1230.

The data selection engine 1240 may select data from the supplemental information database and provide the selected supplemental data to the shared memory 1250. For example, the supplemental information database 1220 may store a navigational database with information regarding routes between locations. The GPU 1270 may process the selected supplemental data to produce graphical data corresponding to one or more routes, and the user interface 1290 may use the graphical data to display one or more indications of the one or more routes, e.g., a line overlaid on a terrain elevation map.

Figure 13:
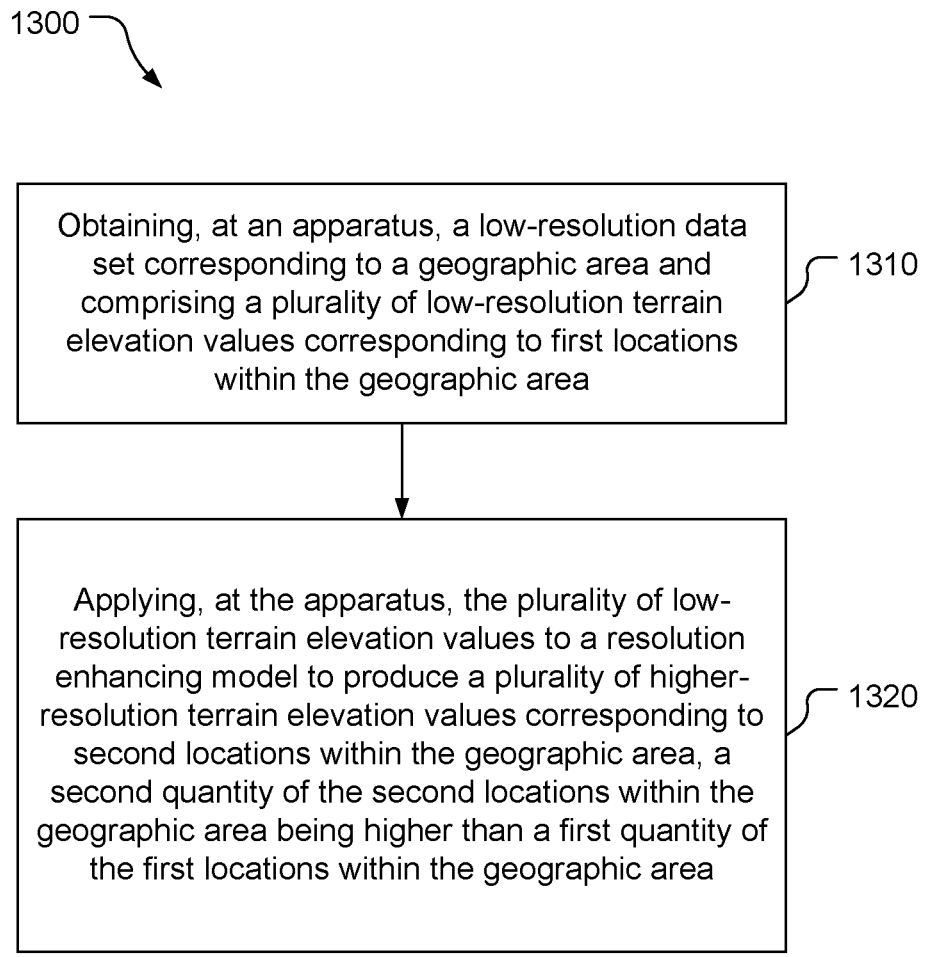
FIG. 13 is a block diagram of a method for generating data.

Referring to FIG. 13, with further reference to FIGS. 1-12, a method 1300 for generating data includes the stages shown. The method 1300 is, however, an example only and not limiting. The method 1300 may be altered, e.g., by having stages added, removed, rearranged, combined, performed concurrently, and/or having single stages split into multiple stages. The method 1300 is, and implementations of the method 1300 are, discussed with respect to an example of generating (and using, e.g., displaying) terrain elevation data, but the method 1300 is applicable to generating other types of higher-resolution data from low-resolution data (and using the higher-resolution data).

At stage 1310, the method 1300 includes obtaining, at an apparatus, a low-resolution data set corresponding to a geographic area and comprising a plurality of low-resolution terrain elevation values corresponding to first locations within the geographic area. For example, the model generation unit 550 may receive low-resolution data via the interface 520 and/or retrieve low-resolution data from the memory 530. The processor 510, possibly in combination with the memory 530 and/or possibly in combination with the interface 520 (e.g., a wired receiver and/or a wireless receiver and an antenna), may comprise means for obtaining the low-resolution data set. As another example, the data generation unit 650 may retrieve low-resolution data from the memory 630. The processor 610, possibly in combination with the memory 630, may comprise means for obtaining the low-resolution data set.

At stage 1320, the method 1300 includes applying, at the apparatus, the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area. For example, the model generation unit 550 may generate higher-resolution terrain elevation data from the low-resolution data set using a resolution enhancing model corresponding to the low-resolution data set. The processor 510, possibly in combination with the memory 530, may comprise means for applying the plurality of low-resolution terrain elevation values to the resolution enhancing model. As another example, the data generation unit 650 may generate higher-resolution terrain elevation data from the low-resolution data set using a resolution enhancing model corresponding to the low-resolution data set. The processor 610, possibly in combination with the memory 630, may comprise means for applying the plurality of low-resolution terrain elevation values to the resolution enhancing model.

Implementations of the method 1300 may include one or more of the following features. In an example implementation, obtaining the low-resolution data set comprises retrieving the low-resolution data set from a memory of the apparatus based on a location estimate for the apparatus. For example, the data generation unit 650 may determine a location estimate (e.g., by receiving an indication of the location estimate and/or by calculating the location estimate from one or more sensor measurements), determine a bounding box that includes the location estimate, and retrieve low-resolution data that corresponds to the bounding box, e.g., all low-resolution data with locations inside the bounding box. The processor 610, in combination with the memory 630 and possibly in combination with the sensor(s) 640 and/or the interface 620, may comprise means for retrieving the low-resolution data set from a memory of the apparatus based on a location estimate for the apparatus. In another example implementation, the method 1300 includes displaying, at the apparatus, an image of pixels with different visual appearances corresponding to different values of the plurality of higher-resolution terrain elevation values. For example, the processor 610 (e.g., the GPU 1270) produces graphical data from the higher-resolution data and stores the graphical data in the memory 630 (e.g., the shared memory 1250), and the processor 610 (e.g., the CPU 1260) causes the interface 620 (e.g., the user interface 1290) to display an image with different colors representing different elevations. The processor 610, the memory 630, and the interface 620 (e.g., the CPU 1260, the GPU 1270, the shared memory 1250, and the user interface 1290) may comprise means for displaying the image.

Also or alternatively, implementations of the method 1300 may include one or more of the following features. In an example implementation, the plurality of low-resolution terrain elevation values are applied to the resolution enhancing model by a resolution enhancing model processor of the apparatus that is configured to perform operations faster than a graphics processing unit of the apparatus. For example, the AI processor 1280 generates the higher-resolution data using the appropriate resolution enhancing model. This may help expedite generation of higher-resolution data, and thus expedite display of one or more terrain elevation image that may, for example, enhance situational awareness for a pilot. In a further example implementation, the method 1300 includes processing a first portion of the plurality of higher-resolution terrain elevation values, corresponding to a first portion of the plurality of low-resolution terrain elevation values, by the graphics processing unit while the resolution enhancing model processor applies a second portion of the plurality of low-resolution terrain elevation values to the resolution enhancing model to produce a second portion of the plurality of higher-resolution terrain elevation values. For example, the GPU 1270 may produce graphical data from higher-resolution data (e.g., corresponding to a first low-resolution data set or a portion of the first low-resolution data set) while the AI processor 1280 generates further higher-resolution data (e.g., based on a second low-resolution data set or a second portion of the first low-resolution data set). The GPU 1270 and the AI processor 1280, and possibly the CPU 1260 (which may coordinate operation of the GPU 1270 and the AI processor 1280) may comprise means for processing the first portion of the plurality of higher-resolution terrain elevation values by the graphics processing unit while the resolution enhancing model processor applies a second portion of the plurality of low-resolution terrain elevation values to the resolution enhancing model.

Also or alternatively, implementations of the method 1300 may include one or more of the following features. In an example implementation, the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the terrain elevation data display method further comprises: obtaining a second low-resolution data set corresponding to a second geographic area that is different from the first geographic area; and applying the second low-resolution data set to a second resolution enhancing model, different from the first resolution enhancing model, to produce a second plurality of higher-resolution terrain elevation values corresponding to the second geographic area. For example, the model generation unit 550 may obtain low-resolution data corresponding to different geographic regions that correspond to different resolution enhancing models, and produce higher-resolution data using the different resolution enhancing models on the respective low-resolution data. The processor 510, possibly in combination with the memory 530 and/or possibly in combination with the interface 520 (e.g., a wired receiver and/or a wireless receiver and an antenna), may comprise means for obtaining the second low-resolution data set. The processor 510, possibly in combination with the memory 530, may comprise means for applying the second low-resolution data set to the second resolution enhancing model. As another example, the data generation unit 650 may obtain (e.g., retrieve from the memory 630) low-resolution data corresponding to different geographic regions that correspond to different resolution enhancing models, and produce higher-resolution data using the different resolution enhancing models on the respective low-resolution data. The processor 610, in combination with the memory 630, may comprise means for obtaining the second low-resolution data set. The processor 610, possibly in combination with the memory 630, may comprise means for applying the second low-resolution data set to the second resolution enhancing model. In a further example implementation, the first low-resolution data set has a first data density that is different from a second data density of the second low-resolution data set. For example, the first low-resolution data set may have 90 m data for one terrain patch and the second low-resolution data set may have 180 m data for another terrain patch.

Also or alternatively, implementations of the method 1300 may include one or more of the following features. In an example implementation, the method 1300 includes: obtaining a high-resolution data set corresponding to the geographic area and comprising a plurality of high-resolution terrain elevation values; and modifying the resolution enhancing model in accordance with a machine-learning algorithm based on a difference between at least a portion of the plurality of higher-resolution terrain elevation values and at least a portion of the plurality of high-resolution terrain elevation values. For example, the model generation unit 550 may receive the high-resolution data set 1034 (e.g., via the interface 520 or by retrieving the high-resolution data set 1034 from the memory 530), and modify the resolution enhancing model, e.g., using a GAN, in response to the higher-resolution data not being within a threshold difference of the high-resolution data set. The processor 510, possibly in combination with the memory 530 and/or possibly in combination with the interface 520, may comprise means for obtaining the high-resolution data set. The processor 510, possibly in combination with the memory 530, may comprise means for modifying the resolution enhancing model. In a further example implementation, the method 1300 includes recursively: applying the plurality of higher-resolution terrain elevation values to the resolution enhancing model; and using the machine-learning algorithm to modify the resolution enhancing model until the plurality of higher-resolution terrain elevation values meet at least one convergence criterion. For example, the model generation unit 550 repeats stages 1110, 1120, 1130 until the latest higher-resolution terrain elevation values produced by the resolution enhancing model (with the latest modification(s)) meets one or more criteria, e.g., is within a threshold difference of respective high-resolution data. The processor 510, possibly in combination with the memory 530, may comprise means for recursively applying the resolution enhancing model to the plurality of higher-resolution terrain elevation values and using the machine-learning algorithm to modify the resolution enhancing model until the plurality of higher-resolution terrain elevation values meet at least one convergence criterion. In a further example implementation, the apparatus is a first apparatus, and the method 1300 includes transmitting the resolution enhancing model to a second apparatus in response to the plurality of higher-resolution terrain elevation values meeting the at least one convergence criterion. For example, in response to the higher-resolution data being determined to be acceptable at stage 1130, the model generation unit 550 transmits the resolution enhancing model, as modified, via the interface 520 (e.g., a wired transmitter and/or a wireless transmitter and an antenna) to the user apparatus 600 (e.g., via one or more intermediate devices such as the TRP 300). The processor 510, possibly in combination with the memory 530, in combination with the interface 520, may comprise means for transmitting the resolution enhancing model to the second apparatus.

Implementation Examples

Implementation examples are provided in the following numbered clauses.

Clause 1. An apparatus comprising:
an interface;
a memory; and
a processor, communicatively coupled to the memory and the interface, configured to:
  obtain a low-resolution data set, the low-resolution data set corresponding to a geographic area and comprising a plurality of low-resolution terrain elevation values corresponding to first locations within the geographic area; and
  apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

Clause 2. The apparatus of clause 1, wherein the processor is configured to obtain the low-resolution data set by retrieving the low-resolution data set from the memory based on a location estimate for the apparatus.

Clause 3. The apparatus of clause 1, further comprising a display communicatively coupled to the processor, wherein the processor is further configured to provide display values, corresponding to the plurality of higher-resolution terrain elevation values, to the display to produce an image of pixels with different visual appearances corresponding to different values of the plurality of higher-resolution terrain elevation values.

Clause 4. The apparatus of clause 3, wherein:
  the processor comprises a graphics processing unit configured to produce the display values;
  the processor further comprises a resolution enhancing model processor that is configured to apply the plurality of low-resolution terrain elevation values to the resolution enhancing model to produce the plurality of higher-resolution terrain elevation values; and
  the resolution enhancing model processor is configured to produce the plurality of higher-resolution terrain elevation values faster than the graphics processing unit.

Clause 5. The apparatus of clause 4, wherein the processor further comprises a central processing unit communicatively coupled to the graphics processing unit and the resolution enhancing model processor and configured to coordinate operation of the graphics processing unit and the resolution enhancing model processor to have the graphics processing unit process a first portion of the plurality of higher-resolution terrain elevation values, corresponding to a first portion of the plurality of low-resolution terrain elevation values, while the resolution enhancing model processor processes a second portion of the plurality of low-resolution terrain elevation values to produce a second portion of the plurality of higher-resolution terrain elevation values.

Clause 6. The apparatus of clause 1, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the processor is further configured to:
  obtain a second low-resolution data set corresponding to a second geographic area that is different from the first geographic area; and
  apply the second low-resolution data set to a second resolution enhancing model, different from the first resolution enhancing model, to produce a second plurality of higher-resolution terrain elevation values corresponding to the second geographic area.

Clause 7. The apparatus of clause 6, wherein the first low-resolution data set has a first data density that is different from a second data density of the second low-resolution data set.

Clause 8. The apparatus of clause 1, wherein the processor is further configured to:
  obtain a high-resolution data set corresponding to the geographic area and comprising a plurality of high-resolution terrain elevation values; and
  modify the resolution enhancing model in accordance with a machine-learning algorithm based on a difference between at least a portion of the plurality of higher-resolution terrain elevation values and at least a portion of the plurality of high-resolution terrain elevation values.

Clause 9. The apparatus of clause 8, wherein the processor is further configured to recursively apply the plurality of higher-resolution terrain elevation values to the resolution enhancing model and use the machine-learning algorithm to modify the resolution enhancing model until the plurality of higher-resolution terrain elevation values meet at least one convergence criterion.

Clause 10. The apparatus of clause 9, wherein the interface comprises a transmitter, and wherein the processor is further configured to transmit the resolution enhancing model to a user apparatus via the transmitter in response to the plurality of higher-resolution terrain elevation values meeting the at least one convergence criterion.

Clause 11. A terrain elevation data generation method comprising:
  obtaining, at an apparatus, a low-resolution data set corresponding to a geographic area and comprising a plurality of low-resolution terrain elevation values corresponding to first locations within the geographic area; and
  applying, at the apparatus, the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

Clause 12. The terrain elevation data generation method of clause 11, wherein obtaining the low-resolution data set comprises retrieving the low-resolution data set from a memory of the apparatus based on a location estimate for the apparatus.

Clause 13. The terrain elevation data generation method of clause 11, further comprising displaying, at the apparatus, an image of pixels with different visual appearances corresponding to different values of the plurality of higher-resolution terrain elevation values.

Clause 14. The terrain elevation data generation method of clause 11, wherein the plurality of low-resolution terrain elevation values are applied to the resolution enhancing model by a resolution enhancing model processor of the apparatus that is configured to perform operations faster than a graphics processing unit of the apparatus.

Clause 15. The terrain elevation data generation method of clause 14, further comprising processing a first portion of the plurality of higher-resolution terrain elevation values, corresponding to a first portion of the plurality of low-resolution terrain elevation values, by the graphics processing unit while the resolution enhancing model processor applies a second portion of the plurality of low-resolution terrain elevation values to the resolution enhancing model to produce a second portion of the plurality of higher-resolution terrain elevation values.

Clause 16. The terrain elevation data generation method of clause 11, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the terrain elevation data generation method further comprises:
  obtaining a second low-resolution data set corresponding to a second geographic area that is different from the first geographic area; and
  applying the second low-resolution data set to a second resolution enhancing model, different from the first resolution enhancing model, to produce a second plurality of higher-resolution terrain elevation values corresponding to the second geographic area.

Clause 17. The terrain elevation data generation method of clause 16, wherein the first low-resolution data set has a first data density that is different from a second data density of the second low-resolution data set.

Clause 18. The terrain elevation data generation method of clause 11, further comprising:
  obtaining a high-resolution data set corresponding to the geographic area and comprising a plurality of high-resolution terrain elevation values; and
  modifying the resolution enhancing model in accordance with a machine-learning algorithm based on a difference between at least a portion of the plurality of higher-resolution terrain elevation values and at least a portion of the plurality of high-resolution terrain elevation values.

Clause 19. The terrain elevation data generation method of clause 18, further comprising recursively:
  applying the plurality of higher-resolution terrain elevation values to the resolution enhancing model; and
  using the machine-learning algorithm to modify the resolution enhancing model until the plurality of higher-resolution terrain elevation values meet at least one convergence criterion.

Clause 20. The terrain elevation data generation method of clause 19, wherein the apparatus is a first apparatus, and the terrain elevation data generation method further comprises transmitting the resolution enhancing model to a second apparatus in response to the plurality of higher-resolution terrain elevation values meeting the at least one convergence criterion.

Clause 21. An apparatus comprising:
  means for obtaining a low-resolution data set corresponding to a geographic area and comprising a plurality of low-resolution terrain elevation values corresponding to first locations within the geographic area; and
  means for applying the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

Clause 22. The apparatus of clause 21, wherein the means for obtaining the low-resolution data set comprise means for retrieving the low-resolution data set from a memory of the apparatus based on a location estimate for the apparatus.

Clause The apparatus of clause 21, further comprising means for displaying an image of pixels with different visual appearances corresponding to different values of the plurality of higher-resolution terrain elevation values.

Clause 24. The apparatus of clause 21, wherein the means for applying the plurality of low-resolution terrain elevation values to the resolution enhancing model comprise means for applying the plurality of low-resolution terrain elevation values to the resolution enhancing model by a resolution enhancing model processor of the apparatus that is configured to perform operations faster than a graphics processing unit of the apparatus.

Clause 25. The apparatus of clause 24, further comprising means for processing a first portion of the plurality of higher-resolution terrain elevation values, corresponding to a first portion of the plurality of low-resolution terrain elevation values, to produce graphical data while the means for applying the plurality of low-resolution terrain elevation values to the resolution enhancing model applies a second portion of the plurality of low-resolution terrain elevation values to the resolution enhancing model to produce a second portion of the plurality of higher-resolution terrain elevation values.

Clause 26. The apparatus of clause 21, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the apparatus further comprises:
  means for obtaining a second low-resolution data set corresponding to a second geographic area that is different from the first geographic area; and
  means for applying the second low-resolution data set to a second resolution enhancing model, different from the first resolution enhancing model, to produce a second plurality of higher-resolution terrain elevation values corresponding to the second geographic area.

Clause 27. The apparatus of clause 26, wherein the first low-resolution data set has a first data density that is different from a second data density of the second low-resolution data set.

Clause 28. The apparatus of clause 21, further comprising:
  means for obtaining a high-resolution data set corresponding to the geographic area and comprising a plurality of high-resolution terrain elevation values; and
  means for modifying the resolution enhancing model in accordance with a machine-learning algorithm based on a difference between at least a portion of the plurality of higher-resolution terrain elevation values and at least a portion of the plurality of high-resolution terrain elevation values.

Clause 29. The apparatus of clause 28, further comprising means for recursively applying the resolution enhancing model to the plurality of higher-resolution terrain elevation values and using the machine-learning algorithm to modify the resolution enhancing model until the plurality of higher-resolution terrain elevation values meet at least one convergence criterion.

Clause 30. The apparatus of clause 29, further comprising means for transmitting the resolution enhancing model to a user apparatus in response to the plurality of higher-resolution terrain elevation values meeting the at least one convergence criterion.

Clause 31. A non-transitory, processor-readable storage medium comprising processor-readable instructions to cause a processor of an apparatus to:
  obtain a low-resolution data set corresponding to a geographic area and comprising a plurality of low-resolution terrain elevation values corresponding to first locations within the geographic area; and
  apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area.

Clause 32. The storage medium of clause 31, wherein the processor-readable instructions to cause the processor to obtain the low-resolution data set comprise processor-readable instructions to cause the processor to retrieve the low-resolution data set from a memory of the apparatus based on a location estimate for the apparatus.

Clause 33. The storage medium of clause 31, further comprising processor-readable instructions to cause the processor to display an image of pixels with different visual appearances corresponding to different values of the plurality of higher-resolution terrain elevation values.

Clause 34. The storage medium of clause 31, wherein the processor-readable instructions to cause the processor to apply the plurality of low-resolution terrain elevation values to the resolution enhancing model comprise processor-readable instructions to cause a resolution enhancing model processor of the apparatus, that is configured to perform operations faster than a graphics processing unit of the apparatus, to apply the plurality of low-resolution terrain elevation values to the resolution enhancing model.

Clause 35. The storage medium of clause 34, further comprising processor-readable instructions to cause the processor to coordinate operation of the graphics processing unit and the resolution enhancing model processor to have the graphics processing unit process a first portion of the plurality of higher-resolution terrain elevation values, corresponding to a first portion of the plurality of low-resolution terrain elevation values, while the resolution enhancing model processor processes a second portion of the plurality of low-resolution terrain elevation values to produce a second portion of the plurality of higher-resolution terrain elevation values.

Clause 36. The storage medium of clause 31, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the processor-readable instructions further comprise processor-readable instructions to cause the processor to:
 obtain a second low-resolution data set corresponding to a second geographic area that is different from the first geographic area; and
 apply the second low-resolution data set to a second resolution enhancing model, different from the first resolution enhancing model, to produce a second plurality of higher-resolution terrain elevation values corresponding to the second geographic area.

Clause 37. The storage medium of clause 36, wherein the first low-resolution data set has a first data density that is different from a second data density of the second low-resolution data set.

Clause 38. The storage medium of clause 31, further comprising processor-readable instructions to cause the processor to:
 obtain a high-resolution data set corresponding to the geographic area and comprising a plurality of high-resolution terrain elevation values; and
 modify the resolution enhancing model in accordance with a machine-learning algorithm based on a difference between at least a portion of the plurality of higher-resolution terrain elevation values and at least a portion of the plurality of high-resolution terrain elevation values.

Clause 39. The storage medium of clause 38, further comprising processor-readable instructions to cause the processor to recursively apply the resolution enhancing model to the plurality of higher-resolution terrain elevation values and use the machine-learning algorithm to modify the resolution enhancing model until the plurality of higher-resolution terrain elevation values meet at least one convergence criterion.

Clause 40. The storage medium of clause 39, further comprising processor-readable instructions to cause the processor to transmit the resolution enhancing model to a user apparatus in response to the plurality of higher-resolution terrain elevation values meeting the at least one convergence criterion.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. An apparatus comprising:
an interface;
a memory; and
a processor, communicatively coupled to the memory and the interface, configured to:
  obtain a location estimate for the apparatus by receiving the location estimate via the interface or by calculating the location estimate from at least one sensor measurement, the location estimate being indicative of a present location of the apparatus;
  obtain a low-resolution data set, the low-resolution data set corresponding to a geographic area and comprising a plurality of low-resolution terrain elevation values corresponding to first locations within the geographic area; and
  apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area;
  wherein the processor is configured to obtain the low-resolution data set by retrieving the low-resolution data set from the memory based on the location estimate for the apparatus.

2. The apparatus of claim 1, further comprising a display communicatively coupled to the processor, wherein the processor is further configured to provide display values, corresponding to the plurality of higher-resolution terrain elevation values, to the display to produce an image of pixels with different visual appearances corresponding to different values of the plurality of higher-resolution terrain elevation values.

3. The apparatus of claim 2, wherein:
the processor comprises a graphics processing unit configured to produce the display values;
the processor further comprises a resolution enhancing model processor that is configured to apply the plurality of low-resolution terrain elevation values to the resolution enhancing model to produce the plurality of higher-resolution terrain elevation values; and
the resolution enhancing model processor is configured to produce the plurality of higher-resolution terrain elevation values faster than the graphics processing unit.

4. The apparatus of claim 3, wherein the processor further comprises a central processing unit communicatively coupled to the graphics processing unit and the resolution enhancing model processor and configured to coordinate operation of the graphics processing unit and the resolution enhancing model processor to have the graphics processing unit process a first portion of the plurality of higher-resolution terrain elevation values, corresponding to a first portion of the plurality of low-resolution terrain elevation values, while the resolution enhancing model processor processes a second portion of the plurality of low-resolution terrain elevation values to produce a second portion of the plurality of higher-resolution terrain elevation values.

5. The apparatus of claim 1, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the processor is further configured to:
  obtain a second low-resolution data set corresponding to a second geographic area that is different from the first geographic area; and
  apply the second low-resolution data set to a second resolution enhancing model, different from the first resolution enhancing model, to produce a second plurality of higher-resolution terrain elevation values corresponding to the second geographic area.

6. The apparatus of claim 5, wherein the first low-resolution data set has a first data density that is different from a second data density of the second low-resolution data set.

7. The apparatus of claim 1, wherein the processor is further configured to:
  obtain a high-resolution data set corresponding to the geographic area and comprising a plurality of high-resolution terrain elevation values; and
  modify the resolution enhancing model in accordance with a machine-learning algorithm based on a difference between at least a portion of the plurality of higher-resolution terrain elevation values and at least a portion of the plurality of high-resolution terrain elevation values.

8. The apparatus of claim 7, wherein the processor is further configured to recursively apply the plurality of higher-resolution terrain elevation values to the resolution enhancing model and use the machine-learning algorithm to modify the resolution enhancing model until the plurality of higher-resolution terrain elevation values meet at least one convergence criterion.

9. The apparatus of claim 8, wherein the interface comprises a transmitter, and wherein the processor is further configured to transmit the resolution enhancing model to a user apparatus via the transmitter in response to the plurality of higher-resolution terrain elevation values meeting the at least one convergence criterion.

10. A terrain elevation data generation method comprising:
  obtaining, at an apparatus, a location estimate for the apparatus by receiving the location estimate via an interface of the apparatus or by calculating, at the apparatus, the location estimate from at least one sensor measurement, the location estimate being indicative of a present location of the apparatus;
  obtaining, at the apparatus, a low-resolution data set corresponding to a geographic area and comprising a plurality of low-resolution terrain elevation values corresponding to first locations within the geographic area; and
  applying, at the apparatus, the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area;
  wherein obtaining the low-resolution data set comprises retrieving the low-resolution data set from a memory of the apparatus based on the location estimate for the apparatus.

11. The terrain elevation data generation method of claim 10, further comprising displaying, at the apparatus, an image of pixels with different visual appearances corresponding to different values of the plurality of higher-resolution terrain elevation values.

12. The terrain elevation data generation method of claim 10, wherein the plurality of low-resolution terrain elevation values are applied to the resolution enhancing model by a resolution enhancing model processor of the apparatus that is configured to perform operations faster than a graphics processing unit of the apparatus.

13. The terrain elevation data generation method of claim 12, further comprising processing a first portion of the plurality of higher-resolution terrain elevation values, corresponding to a first portion of the plurality of low-resolution terrain elevation values, by the graphics processing unit while the resolution enhancing model processor applies a second portion of the plurality of low-resolution terrain elevation values to the resolution enhancing model to produce a second portion of the plurality of higher-resolution terrain elevation values.

14. The terrain elevation data generation method of claim 10, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the terrain elevation data generation method further comprises:
  obtaining a second low-resolution data set corresponding to a second geographic area that is different from the first geographic area; and
  applying the second low-resolution data set to a second resolution enhancing model, different from the first resolution enhancing model, to produce a second plurality of higher-resolution terrain elevation values corresponding to the second geographic area.

15. The terrain elevation data generation method of claim 14, wherein the first low-resolution data set has a first data density that is different from a second data density of the second low-resolution data set.

16. The terrain elevation data generation method of claim 10, further comprising:
  obtaining a high-resolution data set corresponding to the geographic area and comprising a plurality of high-resolution terrain elevation values; and
  modifying the resolution enhancing model in accordance with a machine-learning algorithm based on a difference between at least a portion of the plurality of higher-resolution terrain elevation values and at least a portion of the plurality of high-resolution terrain elevation values.

17. The terrain elevation data generation method of claim 16, further comprising recursively:
  applying the plurality of higher-resolution terrain elevation values to the resolution enhancing model; and
  using the machine-learning algorithm to modify the resolution enhancing model until the plurality of higher-resolution terrain elevation values meet at least one convergence criterion.

18. The terrain elevation data generation method of claim 17, wherein the apparatus is a first apparatus, and the terrain elevation data generation method further comprises transmitting the resolution enhancing model to a second apparatus in response to the plurality of higher-resolution terrain elevation values meeting the at least one convergence criterion.

19. An apparatus comprising:
means for obtaining a location estimate for the apparatus by receiving the location estimate via an interface of the apparatus or by calculating the location estimate from at least one sensor measurement, the location estimate being indicative of a present location of the apparatus;
means for obtaining a low-resolution data set corresponding to a geographic area and comprising a plurality of low-resolution terrain elevation values corresponding to first locations within the geographic area; and
means for applying the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area;
wherein the means for obtaining the low-resolution data set comprise means for retrieving the low-resolution data set from a memory of the apparatus based on the location estimate for the apparatus.

20. The apparatus of claim 19, further comprising means for displaying an image of pixels with different visual appearances corresponding to different values of the plurality of higher-resolution terrain elevation values.

21. The apparatus of claim 19, wherein the means for applying the plurality of low-resolution terrain elevation values to the resolution enhancing model comprise means for applying the plurality of low-resolution terrain elevation values to the resolution enhancing model by a resolution enhancing model processor of the apparatus that is configured to perform operations faster than a graphics processing unit of the apparatus.

22. The apparatus of claim 21, further comprising means for processing a first portion of the plurality of higher-resolution terrain elevation values, corresponding to a first portion of the plurality of low-resolution terrain elevation values, to produce graphical data while the means for applying the plurality of low-resolution terrain elevation values to the resolution enhancing model applies a second portion of the plurality of low-resolution terrain elevation values to the resolution enhancing model to produce a second portion of the plurality of higher-resolution terrain elevation values.

23. The apparatus of claim 19, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the apparatus further comprises:
means for obtaining a second low-resolution data set corresponding to a second geographic area that is different from the first geographic area; and
means for applying the second low-resolution data set to a second resolution enhancing model, different from the first resolution enhancing model, to produce a second plurality of higher-resolution terrain elevation values corresponding to the second geographic area.

24. The apparatus of claim 23, wherein the first low-resolution data set has a first data density that is different from a second data density of the second low-resolution data set.

25. The apparatus of claim 19, further comprising:
means for obtaining a high-resolution data set corresponding to the geographic area and comprising a plurality of high-resolution terrain elevation values; and
means for modifying the resolution enhancing model in accordance with a machine-learning algorithm based on a difference between at least a portion of the plurality of higher-resolution terrain elevation values and at least a portion of the plurality of high-resolution terrain elevation values.

26. The apparatus of claim 25, further comprising means for recursively applying the resolution enhancing model to the plurality of higher-resolution terrain elevation values and using the machine-learning algorithm to modify the resolution enhancing model until the plurality of higher-resolution terrain elevation values meet at least one convergence criterion.

27. The apparatus of claim 26, further comprising means for transmitting the resolution enhancing model to a user apparatus in response to the plurality of higher-resolution terrain elevation values meeting the at least one convergence criterion.

28. A non-transitory, processor-readable storage medium comprising processor-readable instructions to cause a processor of an apparatus to:
obtain a location estimate for the apparatus by receiving the location estimate via an interface of the apparatus or by calculating, at the apparatus, the location estimate from at least one sensor measurement, the location estimate being indicative of a present location of the apparatus;
obtain a low-resolution data set corresponding to a geographic area and comprising a plurality of low-resolution terrain elevation values corresponding to first locations within the geographic area; and
apply the plurality of low-resolution terrain elevation values to a resolution enhancing model to produce a plurality of higher-resolution terrain elevation values corresponding to second locations within the geographic area, a second quantity of the second locations within the geographic area being higher than a first quantity of the first locations within the geographic area;
wherein the processor-readable instructions to cause the processor to obtain the low-resolution data set comprise processor-readable instructions to cause the processor to retrieve the low-resolution data set from a memory of the apparatus based on the location estimate for the apparatus.

29. The storage medium of claim 28, further comprising processor-readable instructions to cause the processor to display an image of pixels with different visual appearances corresponding to different values of the plurality of higher-resolution terrain elevation values.

30. The storage medium of claim 28, wherein the processor-readable instructions to cause the processor to apply the plurality of low-resolution terrain elevation values to the resolution enhancing model comprise processor-readable instructions to cause a resolution enhancing model processor of the apparatus, that is configured to perform operations faster than a graphics processing unit of the apparatus, to apply the plurality of low-resolution terrain elevation values to the resolution enhancing model.

31. The storage medium of claim 30, further comprising processor-readable instructions to cause the processor to coordinate operation of the graphics processing unit and the resolution enhancing model processor to have the graphics processing unit process a first portion of the plurality of higher-resolution terrain elevation values, corresponding to a first portion of the plurality of low-resolution terrain elevation values, while the resolution enhancing model processor processes a second portion of the plurality of low-resolution terrain elevation values to produce a second portion of the plurality of higher-resolution terrain elevation values.

32. The storage medium of claim 28, wherein the geographic area is a first geographic area, the low-resolution data set is a first low-resolution data set corresponding to the first geographic area, the resolution enhancing model is a first resolution enhancing model, and the plurality of higher-resolution terrain elevation values are a first plurality of higher-resolution terrain elevation values, and wherein the processor-readable instructions further comprise processor-readable instructions to cause the processor to:

obtain a second low-resolution data set corresponding to a second geographic area that is different from the first geographic area; and apply the second low-resolution data set to a second resolution enhancing model, different from the first resolution enhancing model, to produce a second plurality of higher-resolution terrain elevation values corresponding to the second geographic area.

33. The storage medium of claim 32, wherein the first low-resolution data set has a first data density that is different from a second data density of the second low-resolution data set.

34. The storage medium of claim 28, further comprising processor-readable instructions to cause the processor to:

obtain a high-resolution data set corresponding to the geographic area and comprising a plurality of high-resolution terrain elevation values; and modify the resolution enhancing model in accordance with a machine-learning algorithm based on a difference between at least a portion of the plurality of higher-resolution terrain elevation values and at least a portion of the plurality of high-resolution terrain elevation values.

35. The storage medium of claim 34, further comprising processor-readable instructions to cause the processor to recursively apply the resolution enhancing model to the plurality of higher-resolution terrain elevation values and use the machine-learning algorithm to modify the resolution enhancing model until the plurality of higher-resolution terrain elevation values meet at least one convergence criterion.

36. The storage medium of claim 35, further comprising processor-readable instructions to cause the processor to transmit the resolution enhancing model to a user apparatus in response to the plurality of higher-resolution terrain elevation values meeting the at least one convergence criterion.

* * * * *